March 4, 1969 J. KARMAZIN 3,430,692
RETURN BEND CONSTRUCTION FOR HEAT EXCHANGERS
Filed June 16, 1967
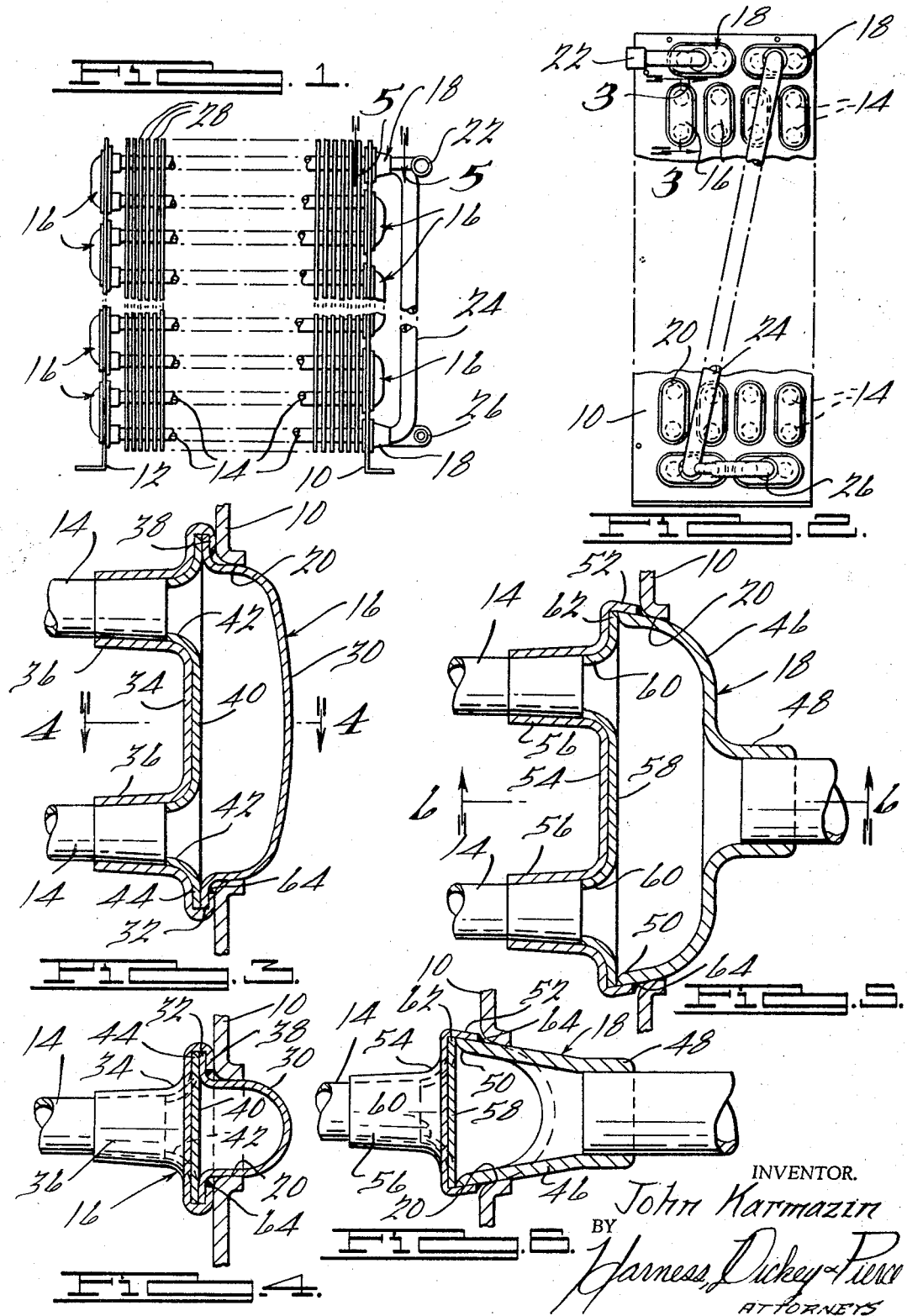
INVENTOR.
John Karmazin
BY
Harness, Dickey & Pierce
ATTORNEYS United States Patent Office 3,430,692
Patented Mar. 4, 1969

3,430,692
RETURN BEND CONSTRUCTION FOR HEAT
EXCHANGERS
John Karmazin, 3776 11th Ave.,
Wyandotte, Mich. 48192
Filed June 16, 1967, Ser. No. 646,653
U.S. Cl. 165—134                5 Claims
Int. Cl. F28f 9/12, 9/04, 19/00

ABSTRACT OF THE DISCLOSURE

An improved connector for connecting the ends of tubes of a heat exchanger which provides for increased strength and durability consisting of a cap portion fastened to an elongated member having two tubular projections integrally formed therewith and further provided with an insert member which is substantially coextensive with and overlies the inner surface of the elongated member and also is integrally formed with tubular projections which are of a length less than those on the elongated member. The composite assembly is securely fastened together by the overlying clamping action of the peripheral portion of the elongated member over the terminal edge of the cap, between which the insert is securely affixed.

Background of the invention

Heat exchangers of the general type to which the connector comprising the present invention is applicable are in widespread commercial use for a variety of fluid heating and cooling systems including oil coolers for vehicles and the like. The increased requirements, as reflected by increased pressures and capacities, have imposed increased structural stresses which, in some instances, has occasioned premature failure of such units particularly when the units are subjected to vibrations and other exteriorly applied forces during use. In many instances the premature failure as evidenced during destructive bench tests of such heat exchanger units has occurred at the bight portion of the U-shaped connectors or return bends utilized for connecting adjacent ends of a pair of tubes in communication with each other. Various techniques have been proposed for strengthening such U-shaped connectors in order that they comply with the more rigorous specifications which have been imposed on heat exchangers of this general type.

In accordance with the construction comprising the present invention, a substantial improvement in the pressure capacity, durability, fatigue life, and strength are achieved necessitating only minimal retooling and only a moderate increase in the cost of manufacture and weight of such U-shaped connectors.

Summary of the invention

The foregoing advantages and benefits of the present invention are achieved by forming a U-shaped connector for connecting the adjacent ends of a pair of heat exchanger tubes in which the connector comprises a cap portion having a generally dish-shaped configuration which terminates in a continuous edge and an elongated sheet member which is integrally formed with a pair of spaced tubular projections and is positioned with its edge having a flange formed therearound disposed in clamped overlying relationship with respect to the edge of the cap portion. An elongated sheet insert is integrally formed with a pair of conformably-shaped tubular projections and is disposed in substantially coextensive overlying relationship on the inner surface of the elongated sheet member and is retained in that position by its terminable edge being disposed in clamped bearing relationship between the edge of the cap member and the terminal portion of the elongated sheet member. The cap portion may be of a closed construction in which case the connector comprises a return bend or, alternatvely, may be formed with an outlet therein wherein the connector provides the function of a manifold.

Other advantages and benefits of the present invention will become apparent upon a reading of the description of the preferred embodiments taken in conjunction with the accompanying drawing.

Brief description of the drawing

FIGURE 1 is a front elevational view of a typical heat exchanger incorporating the U-shaped connectors of the present invention;

FIGURE 2 is an end elevational view of the heat exchanger shown in FIGURE 1;

FIGURE 3 is a vertical sectional view through a return bend of a heat exchanger shown in FIGURE 2 and taken substantially along the line 3—3 thereof;

FIGURE 4 is a transverse horizontal view through the return bend shown in FIGURE 3 and taken substantially along the line 4—4 thereof;

FIGURE 5 is a horizontal sectional view through a manifold as shown in FIG. 1 and taken substantially along the line 5—5 thereof; and FIGURE 6 is a horizontal sectional view through the manifold as shown in FIGURE 5 and taken substantially along the line 6—6 thereof.

Description of the preferred embodiments

Referring now in detail to the drawing and as best seen in FIGURES 1 and 2, a heat exchanger of the type to which the present invention is applicable comprises a framework consisting of a pair of opposed L-shaped members 10, 12, between which a plurality of conduits 14 extend which are disposed in pairs in a plurality of vertically spaced rows. The adjacent ends of the conduits 14 are interconnected and disposed in communication with each other by means of return bends 16 and manifolds 18, which are secured such as by means of a press fit in elongated correspondingly shaped apertures 20 provided in the end members 10, 12.

In the specific arrangement of the heat exhanger illustrated in FIGURES 1 and 2, fluid is admitted to the conduits 14 through an L-shaped inlet tube 22 connected to a manifold 18 which in turn connects a pair of the uppermost conduits 14 at the left-hand portion of the heat exchanger as viewed in FIGURE 2. The fluid entering the conduits passes to the opposite end, at which the fluid enters a return bend 16 which connects the uppermost conduit with a conduit spaced immeditaely therebelow. The fluid continues a sinuous path downwardly through the stacked vertically spaced conduits until it enters the manifold at the lower left-hand portion of the heat exchanger, as viewed in FIGURE 2, and is transferred through a diagonal cross-over tube 24 into a manifold connecting the uppermost pair of conduits at the right-hand corner of the heat exchanger core, as viewed in FIGURE 2. The fluid again undergoes its sinuous path of travel downwardly through the stacked pairs of conduits and finally emerges from a manifold 18 positioned at the lower right-hand corner, as viewed in FIGURE 2, from which it passes into an outlet tube 26 through which it is returned to the fluid system.

As will be noted in FIGURE 1, the conduits 14 are connected in heat conducting relationship to a plurality of vertically extending and horizontally spaced heat conducting fins 28 for enhancing the efficiency of heat transfer to or from the fluid passing through the conduits. In accordance with one embodiment of the heat exchanger, the conduits and heat conductive fins are formed by a plurality of sheets each having a plurality of integrally formed tubular projections thereon which are adapted to be stacked wherein the tubular projections are disposed in nested relationship with one another defining therewith an annular tube having integrally connected fins thereon. The sealing of the nested stacked sheets is achieved by utilizing a suitable solder, brazing compound, or other suitable bonding and sealing material for forming an integral assembly. Alternatively, the conduits and heat transfer fins can be of a composite construction, as may be desired, and positioned so as to define a plurality of pairs of conduits to the ends of which the return bends or manifolds are secured in communicating relationship therewith.

The return bend 16, as best seen in FIGURES 3 and 4, is comprised of an elongated cap 30 which is of a generally dish-shaped configuration and is formed with a continuous edge defining a radially extending flange 32 disposed in a common plane. An elongated sheet member 34 is integrally formed with a pair of spaced tubular projections 36 which are adapted to be connected in sealing relationship with the end portions of the conduits 14. The elongated sheet member 34 is formed with a flange 38 adjacent to the edge portion thereof, which is adapted to be rolled over and disposed in bearing clamping relationship over the flange 32 of the cap 30. An insert 40, comprising an elongated sheet, is similarly formed with a pair of spaced and conformably shaped tubular projections 42 which are disposed in nested overlying relationship within the tubular projection 36 of the elongated sheet member 34. As shown in FIGURES 3 and 4, the insert 40 overlies the inner surface of the elongated sheet member 34, effecting a reinforcement of the bight section thereof between the tubular projections, and is retained in appropriate overlying contact by means of its terminal edge portion 44 disposed in bearing clamped relationship between the flange 32 of the cap 30 and the rolled-over flange 38 of the elongated member 34.

It will be further noted that the configuration of the cap 30 relative to the aperture 20 in the end member 10 is such as to provide a press fit, assuring retention of the return bend in appropriate disposition relative to the conduits.

The manifold 18, as best seen in FIGURES 5 and 6, similarly is comprised of a cap 46 which is of an elongated dish-shaped configuration and which is integrally formed with an outlet tube 48 at substantially the center of the dish-shaped wall thereof. The cap 46 is formed with a terminal edge 50 which is disposed in underlying clamped relationship relative to an overlying flange 52 integrally formed along the peripheral portion of an elongated sheet member 54 having a pair of integrally formed tubular projections 56 extending in spaced relationship therefrom. An elongated sheet insert 58 of a configuration similar to the insert 40 previously described is similarly formed with a pair of conformably shaped tubular projections 60 with are disposed in nested relationship within the tubular projections 56 of the sheet member 54 and the center portion of the insert overlies and rigidifies the bight portion of the sheet member 54. The terminal edges, indicated at 62, of the sheet insert are disposed in firm abutting clamped relationship against the edge 50 of the cap 46 and the overlying flange 52 of the elongated sheet member 54.

As will be noted in FIGURES 5 and 6, the cap 46 similarly is of a configuration relative to the aperture 20 formed in the end member 10 so as to provide an engaging press fit of the manifold therein.

Further rigidification and sealing of the return bends and manifolds is achieved by means of a suitable sealing and bonding material, such as solder or a brazing compound, which is disposed in the region adjacent to the overlying flange on the cap members during the assembly of the heat exchanger core such as by heating the assembly in a suitable brazing furnace, whereafter on subsequent cooling an integral fluid-type exchanger is provided. The soldered or brazed joint, as indicated at 64 in FIGURES 3–6, serves to additionally strengthen the assembly, as well as assuring its fluid-tight integrity.

It will be appreciated that the tubular projections 36 of the return bends 16 and the tubular projections 56 of the manifolds 18 may also be formed of a reduced diameter from that as shown in FIGURES 3–6 wherein they are adapted to be slidably received within the ends of the conduits 14. In the exemplary embodiment as illustrated in FIGURES 3–6, the tubular projections are of an enlarged diameter serving as a female fitting for slidably receiving the conduit ends. When in the form of a female fitting as shown in FIGURES 3–6, the free end of the tubular projection on the insert, which terminates at a point spaced inwardly from the free end of the tubular projection on the elongated sheet member, serves as a stop against which the end edge of the conduit is disposed, providing a smooth transfer of fluid to and from the conduit.

While it will be apparent the invention herein disclosed is well calculated to fulfill the objects above set forth, it will be appreciated that the invention is susceptible to modification, variation and change without departing from the proper scope or fair meaning of the subjoined claims.

What is claimed is:

1. In a heat exchanger including a plurality of tubes disposed in paired relationship, the combination including a connector for connecting the adjacent ends of a pair of tubes in communication with each other, said connector comprising a cap formed with a dish-shaped wall portion and terminating in a continuous edge, an elongated sheet member integrally formed with a pair of spaced tubular projections and having an edge substantially coextensive with said edge of said cap, a flange disposed in clamping overlying relationship over said edge of said cap and said edge of said sheet member, and an insert disposed in substantially coextensive overlying relationship over the inner surface of said member and integrally formed with a pair of conformably shaped tubular projections extending in nested supporting relationship into said tubular projections on said sheet member, said insert retained in position by its edge portion disposed in clamped bearing relationship between the edge portion of said cap and said sheet member.

2. The connector as described in claim 1 wherein the free end of said tubular projection of said insert terminates at a point spaced inwardly of the free end of said tubular projection of said sheet member.

3. The connector as described in claim 1 further including a bonding and sealing material disposed at the connection of said flange with said sheet member and said cap.

4. The connector as described in claim 1 further including an outlet integrally formed in said cap.

5. The connector as described in claim 1 wherein said flange is integrally formed along the edge of said sheet member.

References Cited

UNITED STATES PATENTS

| | | | |
|---|---|---|---|
| 2,950,092 | 8/1960 | DiMiro | 285—157 X |
| 3,027,142 | 3/1962 | Algers et al. | 165—149 X |
| 3,030,782 | 4/1962 | Karmazin | 165—150 X |

ROBERT A. O'LEARY, *Primary Examiner.*

THEOPHIL W. STREULE, *Assistant Examiner.*

U.S. Cl. X.R.

165—178